United States Patent [19]

Horner et al.

[11] 4,125,942
[45] Nov. 21, 1978

[54] GUIDE FOR HAND TOOLS

[76] Inventors: Ralph J. Horner, 1690 Broadway, San Francisco, Calif. 94107; Dwight W. King, 419 Lloyd Ave., San Leandro, Calif. 94578

[21] Appl. No.: 766,987

[22] Filed: Feb. 9, 1977

[51] Int. Cl.² .............................................. B43L 5/00
[52] U.S. Cl. ..................................... 33/76 R; 33/80; 83/745
[58] Field of Search ................... 33/76 R, 80; 83/745; 269/165, 188, 203

[56] References Cited

U.S. PATENT DOCUMENTS

| | | | |
|---|---|---|---|
| 2,735,455 | 2/1956 | Frosberg | 83/745 |
| 2,786,372 | 3/1957 | Lassy | 269/203 |
| 2,942,633 | 6/1960 | King | 33/80 X |
| 3,059,337 | 10/1962 | Lynch | 33/80 X |
| 3,827,468 | 8/1974 | Markham | 33/76 R X |
| 4,016,649 | 4/1977 | Kloster | 83/745 |

FOREIGN PATENT DOCUMENTS 970,495 1/1951 France .......................................... 33/76

*Primary Examiner*—Charles E. Phillips
*Attorney, Agent, or Firm*—Julian Caplan

[57] ABSTRACT

A guide rod is clamped at each end across a board placed flat on a workbench or comprising the workbench. Clamps on each end of the board have extensions with sleeves on their upper ends for receiving the guide rods, as well as flat bars which square against the edges of the board, such that the guide rod will be perpendicular to the sides of the board. In a preferred embodiment, the upper sleeves are pivotable and the clamps are provided with a protractor and square such that the guide rod can be placed across the board at an angle other than perpendicular. A guide carriage comprising a yoke fitting around the guide rod is slideably disposed thereon by means of four wheels, two at each end on either side. The guide carriage has a short rod transversely slideably disposed to the guide rod with a set screw for fixing the extension of the short rod at a given distance from the guide rod. An adjustable H-shaped clamp is secured at the end of the short rod for clamping a hand tool, such as a circular saw, on top of the board such that the hand tool can be moved across the board in a straight line determined by the guide rod.

6 Claims, 8 Drawing Figures

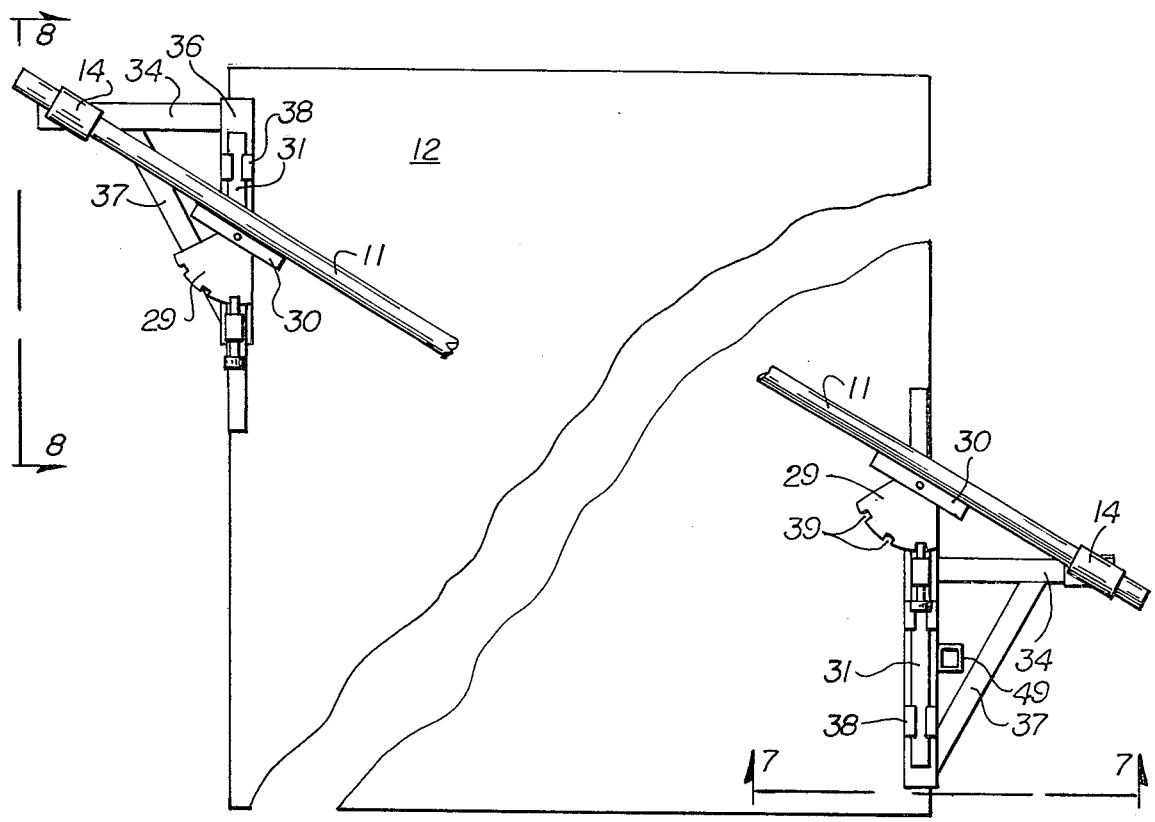
Fig. 6
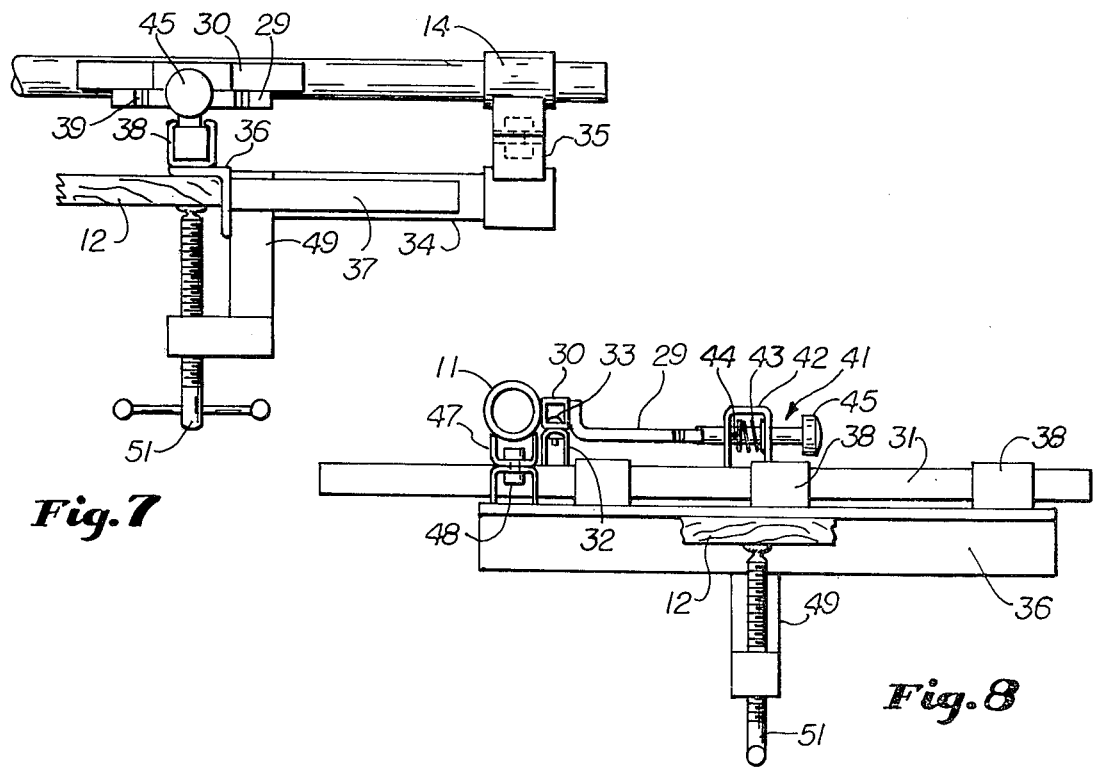
Fig. 7
Fig. 8

GUIDE FOR HAND TOOLS

BACKGROUND OF THE INVENTION

This invention relates to guides for hand tools, and more particularly to a guide for readily assuring the straight line motion of a hand tool, such as a circular saw, across a panel, board or other workpiece, or the panel may comprise the top of a workbench.

Previous hand tool guides, such as those used in the typical lumberyard, call for the boards to be placed in a vertical position such that a circular saw will saw through the board from top to bottom. Straight line cutting is accomplished by means of a horizontal metal bar against which the bottom edge of the board is placed with the saw following a vertical guide as it cuts through the board. When a cut is to be made the board must be moved the desired distance relative to the guide to align the saw with the portion of the board to be cut. This requirement, that the board be moved into proper cutting position, renders present guides awkward, inaccurate and time consuming to use, and otherwise limits their effectiveness.

SUMMARY OF THE INVENTION

The hand tool guide of the present invention utilizes a guide rod which is clamped over the working surface of the board which is preferably horizontal. A guide carriage, comprising a yoke having wheels and fitting around the guide rod, moves across the surface of the board in a straight line determined by the guide rod. The carriage also has a transversely disposed short rod and a set screw, such that the short rod can be extended perpendicularly to the guide rod over the board. A secondary clamp is affixed to the outer end of the short rod for clamping a hand tool, such as a circular saw, onto the board.

It is a primary object of this invention to provide a guide for hand tools which allows the hand tool to be positioned at a given distance from the guide rod without having to move the guide rod or board.

It is another primary object of this invention to provide a guide for hand tools which allows the hand tool to be moved in a straight line across the workpiece at an angle with the sides of the workpiece.

It is a yet further object of this invention to provide a guide for hand tools to be used on a horizontally placed workpiece such as a board or sheet.

It is a still further object of this invention to provide a guide which can be readily clamped onto a board or the like.

It is a further object of this invention to provide an easily assembled and disassembled hand tool guide, and one constructed of inexpensive materials.

This and other objects of the invention will become apparent to one skilled in the art from an examination of the description of the preferred embodiments and the following drawing:

BRIEF DESCRIPTION OF THE DRAWINGS

FIG. 6 shows a top plan view, partially broken away, of a hand tool guide having a T-square and protractor together with a pivotable clamp sleeve for placing the guide rod at an angle across the workpiece.

FIG. 7 shows a partially broken away side view of one of the pivotable clamp means taken along line 7—7 of FIG. 6.

FIG. 8 shows a partially broken away side view of the hand tool guide of FIG. 7 taken along line 8—8 of FIG. 6.

DESCRIPTION OF THE PREFERRED EMBODIMENTS

Figure 1:
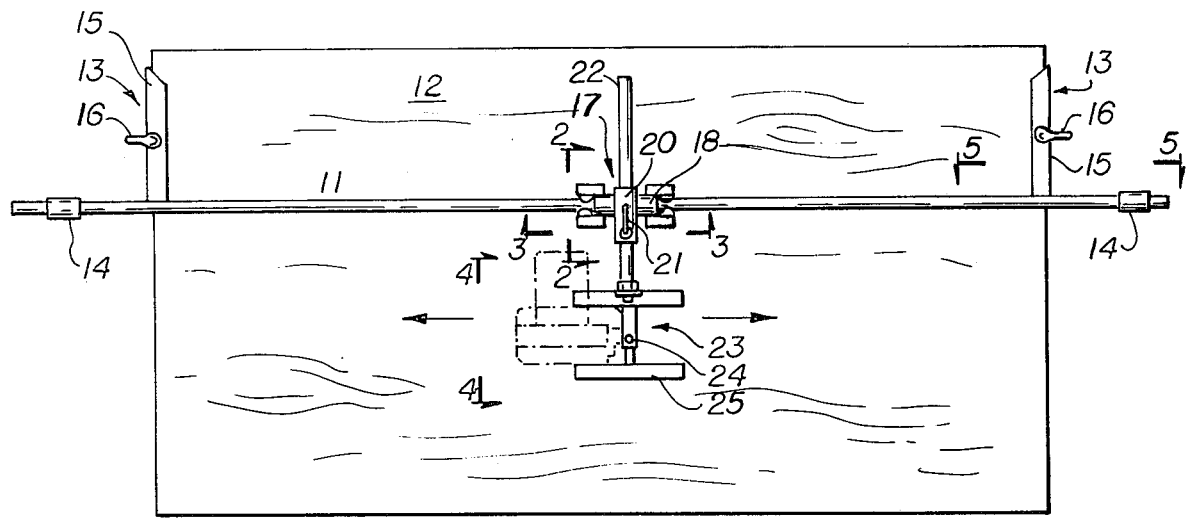
FIG. 1 is a top plan view of the hand tool guide of this invention.

Referring to FIG. 1, guide 11, here shown as a steel tube, is clamped over the top of a preferably horizontally placed board 12 by means of clamps 13 having sleeves 14 for receiving the ends of the guide, and angle bars 15 for squaring the guide rod with the board such that the guide rod will be perpendicular with the sides thereof. The board can be plywood or any similarly shaped workpiece having a substantially flat upper surface for allowing movement of a hand tool across it. The workpiece can be rectangular, as shown, or any other convenient shape. Should an oval-shaped board be used, for example, it would only be necessary that the bars 15 be replaced with curved bars to accomplish the result shown in FIG. 1. The bars 15 are clamped to the workpiece by C-clamps 16.

The guide 11 is of tubular steel or any similar material strong enough to support a guide carriage 17 as it moves across the length of the board 12. The guide 11 is preferably of two lengths, which can be threaded together so as to extend across the full length of long boards. A two-piece construction also allows for disassembly of the hand tool guide into a compact and easily handled tool kit.

The carriage 17 has a yoke 18, which fits under the guide 11, and four wheels 19 bearing above the horizontal axis of the guide, so that the carriage can be easily slid from one end of the board to the other. The carriage 17 also has a sleeve 20 set transversely to the guide rod 11, together with a set screw 21. A short rod 22 is slideably disposed within the sleeve 20 so that a hand tool clamped to the outer end of the short rod 22 by H-clamp 23 can be moved toward or away from the guide rod 11. When the hand tool, shown in dotted lines, is properly located the set screw 21 is turned to secure the short rod 22, and the tool guide is ready for use.

The H-clamp 23 is adjustable by means of set screw 24 and outer bar 25, which can be moved away or toward the inner bar to accommodate larger or smaller hand tools. The hand tool can be a circular saw, a router, plane or any tool usable on a substantially flat workpiece.

Typically, the hand tool guide will be used with a workpiece placed with its flat surface in a horizontal plane, as shown in FIG. 1. But the tool guide of this invention could also be used with a workpiece secured in a vertical position. Whatever the position of the workpiece, the tool guide here described will allow the hand tool to be positioned for straight line motion across the workpiece without the need for moving either the workpiece or the guide; it is only necessary to loosen the set screw 21 and extend or retract the short rod 22, a procedure that can be quickly and easily accomplished.

The dimensions of the hand tool guide of this invention will vary according to the use for which it is intended. However, a convenient and preferred size comprises a ten to twelve inch short rod, a 4 to 6 inch yoke, and a 10 to 12 inch H-clamp for the hand tool.

Figure 2:
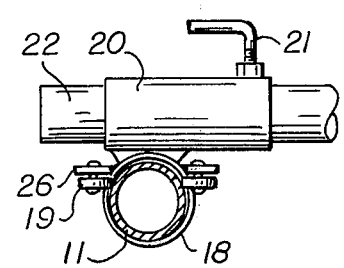
FIG. 2 shows a section of the hand tool guide of FIG. 1 taken along line 2—2.

Referring to FIG. 2, the yoke 18 completely surrounds the guide rod 11 which is contacted by the wheels 19 slightly above its central axis. The wheels 19 are connected to the yoke 18 by brackets 26, the yoke itself being welded or otherwise affixed to the sleeve 20, which receives the transversely disposed short rod 22. Set screw 21 completes the carriage assembly.

Figure 3:
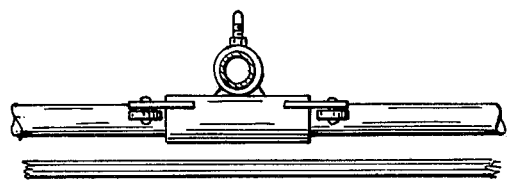
FIG. 3 shows a section of the hand tool guide of FIG. 1 taken along line 3—3.

Referring to FIG. 3, the placement of the wheels 19 slightly above the central axis of the guide rod 11 is more clearly shown, with the brackets 26 extending from the ends of the sleeve 20. The guide rod 11 and carriage yoke 18 are disposed slightly above the board 12 to allow unencumbered movement of the carriage over the board as the hand tool is moved across the board.

Figure 4:
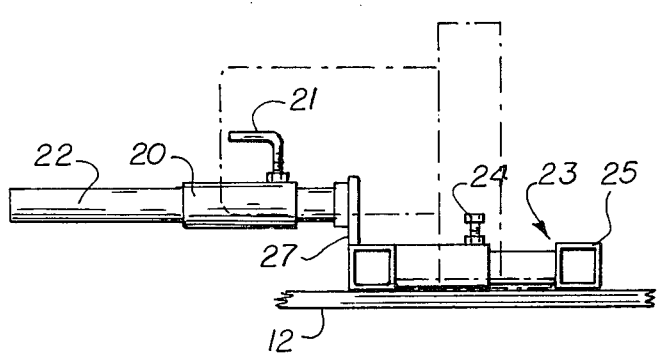
FIG. 4 shows a section of the hand tool guide of FIG. 1 taken along line 4—4.

In FIG. 4, the hand tool (shown in dotted lines) is held by the H-clamp 23 in position on top of the board 12. The outer end 25 of the H-clamp is adjustable by means of hexagonal screw 24, such that hand tools of dimensions other than that shown can also be used in accordance with this invention. The H-clamp 23 is affixed to the outer end of the short rod 22 by means of bracket 27.

Figure 5:
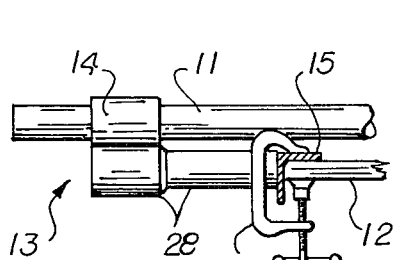
FIG. 5 shows a section of the hand tool guide of FIG. 1 taken along line 5—5.

Referring to FIG. 5, clamp 13 has an attachment means comprising outwardly extending member 28 having a sleeve 14 at its outer end. The member 28 is affixed to flat bar 25, which is clamped to the board 12 by C-clamp 16. Alternately, the C-clamp 16 can contact the bottom of a workbench or the like instead of the workpiece itself, as shown.

An especially preferred clamp means is shown in FIGS. 6–8. The guide rod 11 can be inserted through sleeve 14 and positioned at an angle with the side of board 12 by means of protractor 29 and T-square 30, both of which are pivotably secured to sliding rod 31 by means of bracket 32 and pin 33, as shown in FIG. 8. Sleeve 14 is pivotably secured to the outer end of support bar 34 by means of swivel spacer 35, the inner end of bar 34 being secured to square bar 36. Brace 37 runs from the outer end of bar 34 to the square bar 36. Rod 31 is slideably disposed atop the square bar 36 by brackets 38. In this embodiment the members 14 and 29-38 comprise the attachment means.

As shown more clearly in FIGS. 7 and 8, protractor 29 has notches 39 for engaging the end of a lock pin 41 secured to sliding rod 31 by bracket 42. Spring 43 disposed within the bracket 42 engages pin 44 of the lock pin 41 for urging its end into the notches 39 of the protractor 29. When another setting is required, it is only necessary to manually grasp nob 45 and pull the lock pin from the notches 39, to thereby allow swiveling of T-square 30 and protractor 29 to the desired setting. Movement of guide rod 11, along with protractor 29 and T-square 30, for positioning is allowed by the sliding of rod 31 in brackets 38. Guide rod 11 can be firmly supported in yoke 47, which is pivotably secured to rod 31 by pin 48. L-shaped arm 49 is secured at it upper end to the side portion of square bar 36, and has clamping screw 51 disposed in its lower end for clamping the square bar 36 to the board 12.

Although specific embodiments have been described, it is clear that modifications of the invention can be made by those skilled in the art without departing from the spirit thereof, as set forth in the following claims.

What is claimed is:

1. Guide means for hand tools used on a flat workpiece comprising a guide rod adapted to be fixed over the working surface of the workpiece, clamp means for clamping the rod onto the workpiece, said clamp means having an angle bar to fit against the top and one edge of said workpiece, attachment means to attach said angle bar to said guide rod so that said angle bar is below the level of said guide rod and a clamp on said angle bar to clamp said angle bar to said workpiece, a guide carriage slideably disposed on the rod and having a transverse member, a short rod slideably disposed on the guide carriage by the transverse member thereof, and a secondary clamp affixed to the end of the short rod for clamping of the hand tool, whereby a hand tool can be clamped onto the end of the short rod and moved along a straight line at a distance from the guide.

2. The guide means of claim 1 wherein the guide carriage comprises a tubular yoke slideably disposed on the guide rod, four wheels secured to the yoke, two at each end on opposite sides and each extending beyond the ends of the yoke such that they contact the guide slightly above its central axis, a transverse sleeve member affixed atop the slideable yoke, and a set screw disposed atop the transverse sleeve member and extending therethrough to secure the short rod to the transverse tube.

3. The guide means of claim 1 wherein the secondary clamp for clamping the hand tool to the outer end of the short rod comprises an H-clamp having a set screw disposed in its cross piece and a slideable disposed outer bar, such that the clamp is adjustable for various-sized hand tools.

4. The guide means of claim 1 wherein the guide rod comprises two separate tubes which can be screwed together for use and unscrewed for compact storage or carrying.

5. The guide means of claim 1 wherein said attachment means comprises a support bar connected to the angle bar and extending outwardly from the edge of the workpiece, a sleeve pivotably secured atop the outer end of the support bar for receiving the end of the guide rod, the angle bar having a sliding rod slideably disposed on its upper surface, a protractor and T-square pivotably affixed to the sliding rod for alignment with the guide rod in determining the desired angle at which the guide rod is to be placed across the workpiece, a lock pin disposed on the sliding rod for locking the protractor and T-square at the desired angle, and a second clamp for holding the square against the workpiece.

6. The guide means of claim 5 wherein the protractor has notches for engaging the lock pin, and wherein a spring urges the lock pin into locking relationship against the protractor notches.

* * * * *